(No Model.)
E. C. PFEIFFER.
TIRE FASTENER.
No. 317,847. Patented May 12, 1885.
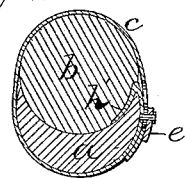
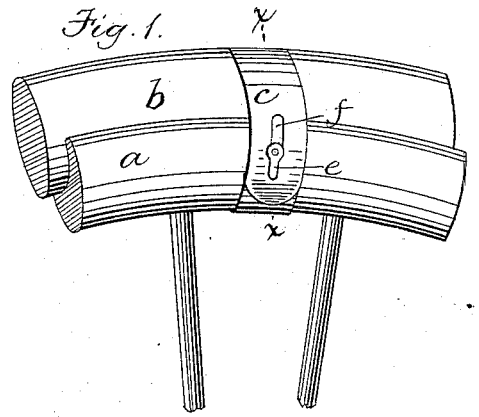
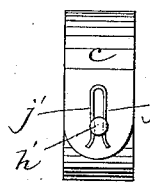 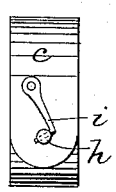 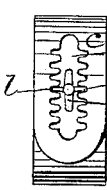 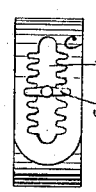 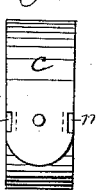 
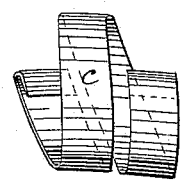
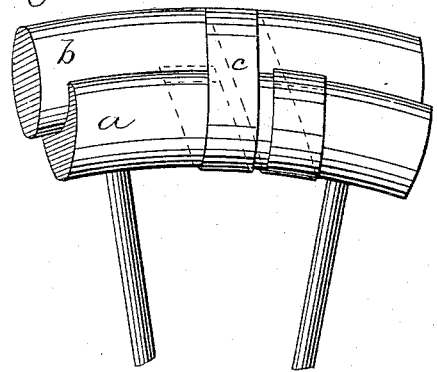
Witnesses.
H. Brown
Chas. S. Gooding.
Inventor
E. C. Pfeiffer
by Might & Brown
Attys
N. PETERS, Photo-Lithographer, Washington, D. C.

UNITED STATES PATENT OFFICE.

EMIL CHARLES PFEIFFER, OF PORTSMOUTH, NEW HAMPSHIRE.

TIRE-FASTENER.

SPECIFICATION forming part of Letters Patent No. 317,847, dated May 12, 1885.

Application filed August 25, 1884. (No model.)

*To all whom it may concern:*

Be it known that I, EMIL CHARLES PFEIFFER, of Portsmouth, in the county of Rockingham and State of New Hampshire, have invented certain Improvements in Tire-Fasteners, of which the following is a specification.

This invention has for its object to provide a device for securing tires to wheel-rims, and particularly flexible tires, such as are used on bicycle and tricycle wheels.

The invention consists, as a whole, in a fastener composed of a band of suitable material adapted to clasp or encircle the tire or wheel-rim, and provided with fastening devices whereby it may be secured upon the wheel, the construction being preferably such that the band can be easily applied and removed without the aid of tools or special appliances.

The invention also consists in certain details, all of which I will now proceed to describe.

Of the accompanying drawings, forming a part of this specification, Figure 1 represents a side view of a portion of a bicycle-wheel rim and tire provided with my improvement. Fig. 2 represents a section on line $x\,x$, Fig. 1. Figs. 3, 4, 5, 6, 7, and 8 represent different fastening devices; and Figs. 9 and 10 represent a form of band which requires no special fastening devices.

The same letters of reference indicate the same parts in all the figures.

In the drawings, $a$ represents the metallic rim of a bicycle-wheel, and $b$ the flexible tire thereof, said parts being of the usual form.

In carrying out my invention I provide a band, $c$, of any suitable material, and of suitable length to clasp or encircle the tire and rim, said band preferably being so thin as to prevent it from forming a protuberance on the tire, which would cause a jolt or jar. The band is provided with devices whereby it may be fastened in the form of a ring or loop. Said devices may be variously modified in construction without departing from the spirit of my invention.

In Figs. 1 and 2 I have shown a button, $e$, pivoted to the band near one end, the band being provided near its other end with a slot, $f$, adapted to receive the button. The form of the button and slot is such that when the button is partly turned it does not coincide with the slot, and therefore holds the overlapping ends of the bands so that they cannot be separated.

In Fig. 3 I have shown a stud, $h$, on the band near one end, and an orifice in the band near its other end adapted to receive the stud. A hook, $i$, is pivoted to the band, and is adapted to pass through an orifice in the stud $h$ to prevent it from being drawn out of the orifice in the band. Figs. 4 and 5 show the band provided with a pivoted button, $s$, near one end, and under said button two fixed projections, $l\,l$. In the outer end of the band is an elongated slot, $m$, having several notches or recesses in its edges adapted to receive the fixed projections $l\,l$, as shown in Fig. 4. The slot $m$ is of sufficient width to receive the button $e$ when the latter is in the position shown in Fig. 4. When the button is turned, as shown in Fig. 5, it extends across the slot and holds the outer end of the band against the inner end. The notches and fixed projections enable the band to be adjusted to wheel rims and tires of different sizes, the diameter of the loop, ring, or clasp formed by the band being determined by the position of the projections $l\,l$.

Figs. 6 and 7 show the outer portion of the band provided with notches $m'\,m'$ and the inner portion with spring-catches $m^2\,m^2$, adapted to engage with the notches $m'\,m'$ when the outer portion of the band is passed between said catches, which are formed on a piece riveted to the band, as shown in dotted lines.

Fig. 8 shows the outer portion of the band provided with an aperture over which extend wire springs $j'\,j'$, soldered to the outer surface of the band. The inner portion of the band has a conical-headed stud, $h'$, adapted to enter said orifice. When the outer end of the band is pressed upon the stud, the springs $j'\,j'$ snap into a groove formed at the base of the conical head of the stud, and thus secure the outer end of the band to said stud.

Figs. 9 and 10 represent a band of suitable material, and of suitable length to clasp or encircle the tire, and provided with or bent into a hook at each end, which hooks are inserted on each side into the crevice between the flexible tire and the rim, the band being bent about the tire in a slightly oblique direction to admit of said insertion.

I do not confine myself to the above-described forms of fastening, but may employ other suitable forms.

The inner end of the band may be bent into a hook to engage with one edge of the wheel-rim, as shown in Fig. 2. The band is thus prevented from turning on the rim and tire.

It will be seen that the band forms a secure connection between the tire and rim, preventing the displacement of the tire. Any desired number of the bands may be used on a wheel, and they may be applied by any person of ordinary intelligence, no special skill being required. It is obvious that this invention is applicable to all wheels having rims and tires not joined in one, but which may require to be fastened securely together.

I claim—

1. A fastener for wheel-tires, composed of a band of suitable material adapted to encircle the wheel rim and tire, the same being bent at one end to engage the wheel-rim, as set forth.

2. A fastener for wheel-tires, composed of a band bent at one end to form a hook for engagement with the wheel-rim, and provided with fastening devices to secure its outer end, as set forth.

3. A fastener for wheel-tires, composed of a band adapted to encircle or clasp the tire and wheel-rim, and provided with a pivoted stud or button near one end and a slot near the other end to receive said stud or button, as set forth.

4. A fastener for wheel-tires, composed of a band adapted to encircle or clasp the tire and wheel-rim, and provided with a pivoted stud or button and fixed projections near one end, and an elongated slot adapted to receive said button, and having a number of recesses in its edges adapted to receive said fixed projections, as set forth.

In testimony whereof I have signed my name to this specification, in the presence of two subscribing witnesses, this 15th day of August, 1884.

EMIL CHARLES PFEIFFER.

Witnesses:
C. A. HAZLETT,
W. W. McINTIRE.